United States Patent
Abramson et al.

(10) Patent No.: US 10,896,270 B2
(45) Date of Patent: Jan. 19, 2021

(54) METHOD FOR SOLVING MULTI-FIDELITY OPTIMIZATION PROBLEMS

(71) Applicant: The Boeing Company, Chicago, IL (US)

(72) Inventors: Mark A. Abramson, Bellevue, WA (US); Andrew J. Booker, Seattle, WA (US); Evin J. Cramer, Mercer Island, WA (US); Joseph P. Simonis, Webster Groves, MO (US)

(73) Assignee: The Boeing Company, Chicago, IL (US)

( * ) Notice: Subject to any disclaimer, the term of this patent is extended or adjusted under 35 U.S.C. 154(b) by 530 days.

(21) Appl. No.: 14/794,792

(22) Filed: Jul. 8, 2015

(65) Prior Publication Data

US 2017/0011143 A1    Jan. 12, 2017

(51) Int. Cl.
*G06F 30/20*    (2020.01)

(52) U.S. Cl.
CPC .................. *G06F 30/20* (2020.01)

(58) Field of Classification Search
CPC ...... G06F 17/5009; G06F 17/50; G06F 30/20; G06F 30/00
See application file for complete search history.

(56) References Cited

PUBLICATIONS

Audet, Charles, and John E. Dennis Jr. "A progressive barrier for derivative-free nonlinear programming." SIAM Journal on Optimization 20.1 (2009): 445-472.*

Huang, Deng, et al. "Sequential kriging optimization using multiple-fidelity evaluations." Structural and Multidisciplinary Optimization 32.5 (2006): 369-382.*

Audet, Charles, and John E. Dennis Jr. "Mesh adaptive direct search algorithms for constrained optimization." SIAM Journal on optimization 17.1 (2006): 188-217.*

Huang Likeng, Zhenghong Gao, and Dehu Zhang. "Research on multi-fidelity aerodynamic optimization methods." Chinese Journal of Aeronautics 26.2 (2013): 279-286.*

Audet, Charles, and John E. Dennis Jr. "A progressive barrier for derivative-free nonlinear programming." SIAM Journal on Optimization 20.1 (2009): 445-472. (Year: 2009).*

Huang, Deng, et al. "Sequential kriging optimization using multiple-fidelity evaluations." Structural and Multidisciplinary Optimization 32.5 (2006): 369-382. (Year: 2006).*

Audet, Charles, and John E. Dennis Jr. "Mesh adaptive direct search algorithms for constrained optimization." SIAM Journal on optimization 17.1 (2006): 188-217. (Year: 2006).*

(Continued)

*Primary Examiner* — Omar F Fernandez Rivas
*Assistant Examiner* — Joshua E. Jensen
(74) *Attorney, Agent, or Firm* — von Briesen & Roper, s.c.

(57) ABSTRACT

A computer-implemented search and poll method can iteratively solve a multi-fidelity optimization problem including an objective function and any constraints. A search step of the method includes constructing and optimizing surrogates of the objective function and any constraints to identify a new set of trial points, and running lower fidelity simulations in ascending order to reduce a number of trial points in the new set. The search step further includes evaluating the reduced number of trial points with the objective function and any constraints using a high fidelity simulation.

20 Claims, 2 Drawing Sheets

(56) References Cited

PUBLICATIONS

Huang Likeng, Zhenghong Gao, and Dehu Zhang. "Research on multi-fidelity aerodynamic optimization methods." Chinese Journal of Aeronautics 26.2 (2013): 279-286. (Year: 2012).*

Singh, Gulshan, and Ramana V. Grandhi. "Mixed-variable optimization strategy employing multifidelity simulation and surrogate models." Aiaa Journal 48.1 (2010): 215-223. (Year: 2010).*

Perdikaris, P., et al. "Multi-fidelity modelling via recursive co-kriging and Gaussian—Markov random fields." Proc. R. Soc. A 471.2179 (2015): 20150018. (Year: 2015).*

Choi, Seongim, Juan Alonso, and Ilan Kroo. "Multi-fidelity design optimization studies for supersonic jets using surrogate management frame method." 23rd AIAA Applied Aerodynamics Conference. 2005. (Year: 2005).*

Koziel, Slawomir, David Echeverria Ciaurri, and Leifur Leifsson. "Surrogate-based methods." Computational optimization, methods and algorithms. Springer, Berlin, Heidelberg, 2011. 33-59. (Year: 2011).*

Marsden, Alison L., et al. "Optimal aeroacoustic shape design using the surrogate management framework." Optimization and Engineering 5.2 (2004): 235-262. (Year: 2004).*

Kampolis, Ioannis C., et al. "Multilevel optimization strategies based on metamodel-assisted evolutionary algorithms, for computationally expensive problems." 2007 IEEE Congress on Evolutionary Computation. IEEE, 2007. (Year: 2007).*

Sparkman, Bryan, et al. "Optimization of a scramjet fuel injection array: an application of mixed variable generalized pattern search with kriging surrogates." 12th AIAA/ISSMO Multidisciplinary Analysis and Optimization Conference. 2008. (Year: 2008).*

C. Audet and J. E. Dennis, Jr., "A progressive barrier for derivative-free nonlinear programming," SIAM Journal on Optimization, vol. 20, No. 1, pp. 445-472 (2009).

C. Audet et al., "Mesh adaptive direct search algorithms for constrained optimization," SIAM Journal on Optimization, vol. 18, No. 4, pp. 1501-1503 (2008).

H. Likeng et al., "Research on multi-fidelity aerodynamic optimization methods," Chinese Journal of Aeronautics, vol. 267, No. 2, pp. 286 (2013).

* cited by examiner

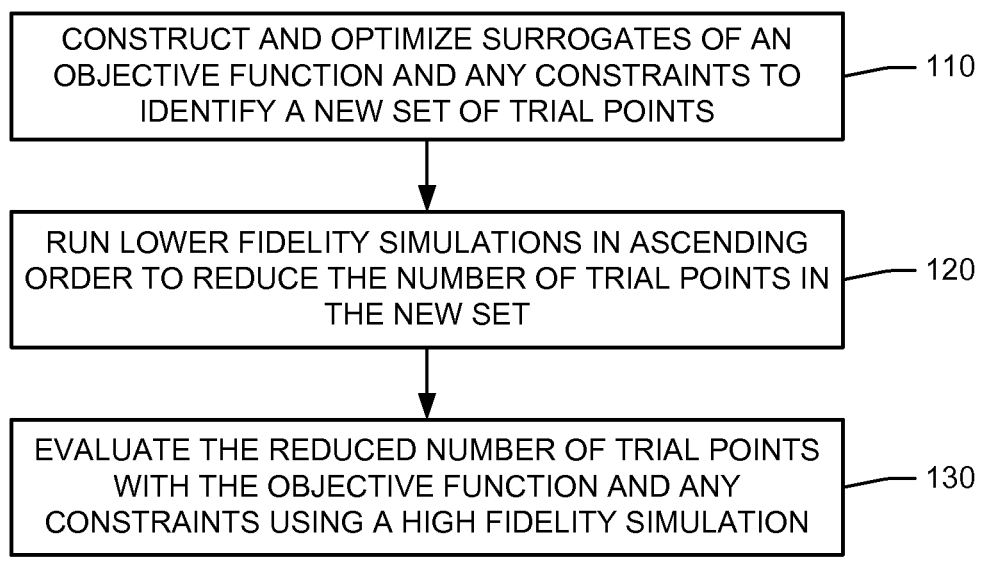
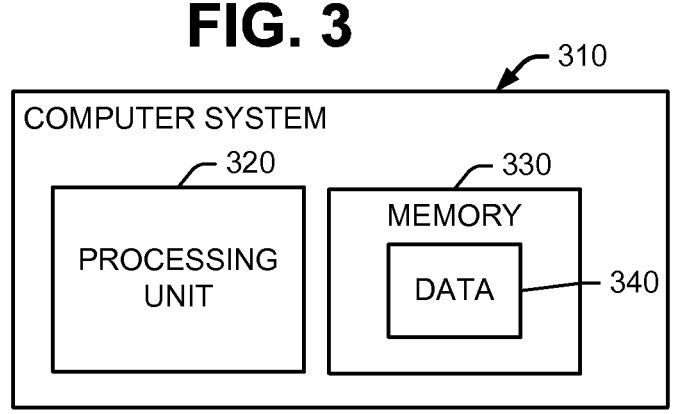

METHOD FOR SOLVING MULTI-FIDELITY OPTIMIZATION PROBLEMS

BACKGROUND

In engineering design, an optimal design is often obtained by minimizing or maximizing an objective function (e.g., cost, weight, drag) subject to constraints (e.g., stress, geometry). In doing so, evaluation of the objective and constraint functions frequently involves running a simulation.

A high fidelity simulation may be performed to find a solution to such an optimization problem. However, calling a high fidelity aerodynamic simulation is computationally expensive. For instance, a high fidelity simulation involving the design of an airfoil can take several days to run.

Simulations with varying levels of lower fidelity may be available. Although the lower fidelity simulations are much faster to run (e.g., taking seconds versus days), they are less accurate than the high fidelity simulation.

An optimization method may be used to find a solution to an optimization problem. The optimization method systematically generates trial points that are evaluated by the objective and constraint functions, which, in turn, call the high fidelity simulation. For many optimization methods, a mathematical convergence theory has been developed to establish conditions (e.g., requiring the objective and constraint functions to be smooth and continuous) under which a sequence of trial points achieve convergence to a solution.

A search and poll method is an efficient way to find a solution to a class of optimization problems in which derivatives (either analytical or numerical) are unavailable or unreliable, and objective and constraint functions are non-smooth or discontinuous or fail when queried. Search and poll methods have been applied effectively to this class of optimization problems with two fidelity levels. Above two fidelity levels, however, complexity and computational cost are increased, and solution methods are scarce.

SUMMARY

According to an embodiment herein, a computer-implemented search and poll method can iteratively solve a multi-fidelity optimization problem including an objective function and any constraints. A search step of the method includes constructing and optimizing surrogates of the objective function and any constraints to identify a new set of trial points, and running lower fidelity simulations in ascending order to reduce a number of trial points in the new set. The search step further includes evaluating the reduced number of trial points with the objective function and any constraints using a high fidelity simulation.

According to another embodiment herein, a computer comprises a processor and memory encoded with data for causing the processor to perform a search and poll method to iteratively solve a multi-fidelity optimization problem including an objective function and any constraints. A search step of the method includes constructing and optimizing surrogates of the objective function and any constraints to identify a new set of trial points, running lower fidelity simulations in ascending order to reduce a number of trial points in the new set, and evaluating the reduced number of trial points with the objective function and any constraints using a high fidelity simulation.

According to another embodiment herein, an article comprises computer-readable memory encoded with data. The data, when executed, causes a computer to perform a search and poll method to iteratively solve a multi-fidelity optimization problem including an objective function and any constraints. A search step of the method includes constructing and optimizing surrogates of the objective function and any constraints to identify a new set of trial points, running lower fidelity simulations in ascending order to reduce a number of trial points in the new set, and evaluating the reduced number of trial points with the objective function and any constraints using a high fidelity simulation.

These features and functions may be achieved independently in various embodiments or may be combined in other embodiments. Further details of the embodiments can be seen with reference to the following description and drawings.

BRIEF DESCRIPTION OF THE DRAWINGS

FIG. 1 is an illustration of a search step for a search and poll optimization method.

FIG. 3 is an illustration of a system for performing a search and poll optimization method.

DETAILED DESCRIPTION

Figure 2:
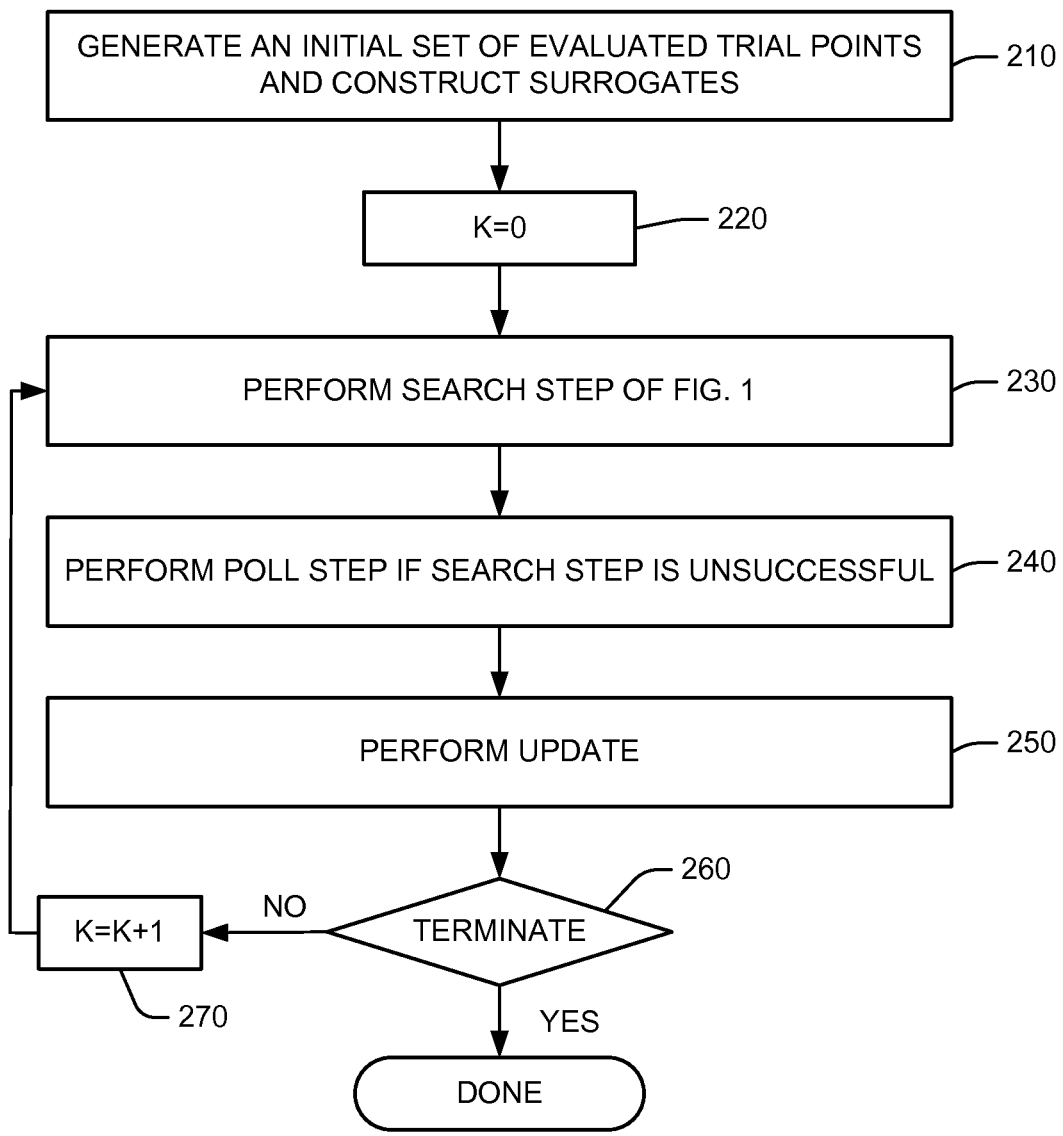
FIG. 2 is an illustration of a search and poll optimization method including the search step of FIG. 1.

Consider an optimization problem in which derivatives (either analytical or numeric-al) are unavailable or unreliable, and objective and constraint functions may be non-smooth or discontinuous, or may fail when queried. The optimization problem involves minimizing the objective function subject to nonlinear constraints that are formulated as being less than or equal to zero.

A search and poll method may be used to solve the optimization problem. The search and poll method is a generalization of the convergent class of mesh adaptive direct search (MADS) methods. MADS is iterative in that, at each iteration, it generates a finite number of trial points in the hope of finding a better trial point than the current best point or incumbent solution. Specifically, the search and poll method is used to iteratively generate trial points having either a lower objective function value or a lower constraint violation (as defined by the sum of squares of the constraint violations). For a detailed discussion of MADS methods, see C, Audet and J. E. Dennis, Jr., "A progressive barrier for derivative-free nonlinear programming," SIAM Journal on Optimization, vol. 20, no. 1, pp. 445-72 (2009).

Reference is made to FIG. 1, which illustrates a search step for a search and poll method. At block 110, surrogates of the objective function and any constraints are constructed (e.g., built, updated, recalibrated) and optimized to identify a new set of trial points. The surrogates are only approximations, and they do not always capture the behavior of the objective function and any constraints.

At block 120, lower fidelity simulations are run in ascending order to reduce the number of trial points in the new set. If there are M levels of fidelity, with M being the highest level, then the lower fidelity simulations are run in ascending order from m=1, 2, 3, . . . , M−1. Those trial points predicted to perform poorly by the lower fidelity simulations are deleted.

At block 130, the reduced number of trial points is then evaluated by the objective function and any constraints with a high fidelity simulation. The high fidelity simulation is run only once per search step.

By reducing the computational load required to solve problems of this type, the search step of FIG. 1 runs faster and more efficiently than a search step of a conventional search and poll method. Computational cost is kept down by progressing through the lower fidelity levels in ascending order (m=1, 2, 3, . . . , M) and discarding trial points that are not predicted to do well when evaluated by higher fidelity models. An increase in computational speed comes from not having to evaluate all of the points in the initial set with the objective function and any constraints using the highest level of fidelity.

Construction of the surrogates at block 110 may include constructing surrogates for the objective function and any constraints as functions of the input variables and also fidelity level. Thus, the surrogates are constructed as mixed variable surrogate functions. Let f(m,x) represent the objective function, and c(m,x) represent constraints on the set of input variables x, where m is the fidelity level from m=1, 2, . . . M. The surrogate functions may be represented by $\phi$(m, x) and $\zeta$(m, x). The surrogate function $\phi$(m, x) is the surrogate of the true objective function f(m,x), and the surrogate function $\zeta$(m, x) is the surrogate of the true constraints c(m,x). The objective function f(m,x) and the constraints c(m,x) are also mixed variable because they incorporate the fidelity level as an additional variable, with each value resulting in a different fidelity simulation being used in the function evaluations.

Kriging functions may be used as the mixed variable surrogate functions. For information on how to use kriging functions to construct mixed variable surrogate functions, see, e.g., P. Z. G. Qian, et al., "Gaussian process models for computer experiments with qualitative and quantitative factors," *Technometrics*, 50(3):383-396, 2008; and Q. Zhou et al., "A simple approach to emulation for computer models with qualitative and quantitative factors," *Technometrics*, 53(3):266-273, 2011.

The use of mixed variable kriging functions as surrogate functions avoids explicitly modeling the differences between simulations of different fidelities. Each kriging function includes a regression function (for capturing the general trend), plus a correlation term to capture the difference between the regression and the points being fit, so that the resulting surrogate function interpolates all of the data points (i.e., at the data points, the objective function and any constraints, and their surrogates have the same value). The correlation term is represented by a large matrix that increases in size each time an evaluated trial point is incorporated into the kriging functions.

Traditional kriging functions (that is, kriging functions that are not mixed variable) may be used. However, the regression function and correlation matrix are constructed for each level of fidelity.

An advantage of the mixed variable kriging functions is that a single regression function and a large correlation matrix may be constructed to take as inputs both the problem variables and the fidelity level. The resulting correlation matrix is a little larger (to handle the additional variable), but only one correlation matrix is needed. Above two fidelity levels, the increase in complexity and computational cost is relatively small in comparison to explicitly modeling the differences between simulations of different fidelities.

The surrogate functions may be constructed from other types of functions. Other types include least degree polynomials and radial basis functions.

Optimization of the surrogates at block 110 may include minimizing the surrogate objective function subject to the surrogate constraints to generate a new set of points. The surrogate functions are much less expensive to evaluate than the objective function and any constraints at the highest fidelity level. The surrogate functions may even be less expensive to evaluate than the objective function and constraints at low levels of fidelity. Thus, the role of the surrogates is to inexpensively generate the trial points in the new set that are very close to the solution of the optimization problem, but at a fraction of the computational cost.

The surrogate functions are interpolatory, meaning that they fit all of the data points that have been evaluated. Whenever new points are generated and then evaluated by the functions at any fidelity level, the surrogates may be updated or recalibrated to include the newly evaluated points. Thus, when a surrogate function is updated, the updated surrogate function retains both good and bad trial points. No trial points are discarded from the surrogate functions unless a requested function evaluation fails to return a value. The set of trial points is only narrowed by the remainder of the search step.

Use of the lower fidelity simulations at block 120 is performed to determine whether the trial points in the new set are good or bad. Bad points are pared from the new set of trial points. Thus, at each iteration, the lower fidelity simulations are used as predictors to reduce the number of trial points in the new set. If the surrogates provide good approximations of the objective function and any constraints, then they have some predictive power.

The low fidelity simulations are usually simplified physics models of the high fidelity simulations. As one simple example, a high fidelity simulation describes three-dimensional flow of air over an airfoil, a lower fidelity simulation describes two-dimensional flow, and the lowest fidelity simulation describes one-dimensional flow.

Reference is now made to FIG. 2, which illustrates a search and poll method that includes the search step of FIG. 1. At block 210, a preliminary set $V_0$ of points is generated. The preliminary set $V_0$ may be obtained by a carefully constructed "design of experiments", so that the initial models are as accurate as possible. Each point in the preliminary set $V_0$ is evaluated by the objective function and any constraints, which call the high fidelity simulation, yielding the preliminary set $V_0$ of evaluated trial points.

Also at block 210, the surrogates of the objective function and any constraints are constructed. The surrogates may be constructed from the preliminary set $V_0$ of trial points.

At block 220, an outer loop is initialized. An outer loop index k is set to k=0.

At block 230, a search step is performed.
  a. Update the surrogates from $V_k$ and solve the surrogate optimization problem at m=M to identify a new set $S_k$ of trial points.
  b. For m=1, 2, . . . , M−1
    i. If $S_k$ is empty, go to block 240.
    ii. Evaluate f(m,x) and c(m,x) at points x∈$S_k$ and update the surrogates.
    iii. Evaluate $\phi$(M, x) and $\zeta$(M, x) at points x∈$S_k$.
    iv. Remove trial points from $S_k$ for which $\phi$ and $\zeta$ do not predict a high likelihood of a successful iteration.
  c. Evaluate f(M,x) and c(M,x) at points x∈$S_k$. Update the surrogates.

At block 240, a poll step is performed if the search step is unsuccessful (e.g., the search step yields an empty set for $S_k$, or doesn't improve upon the incumbent solution). In the poll step, the objective function and any constraints are evaluated (using the highest level of fidelity) for a different set $P_K$ of trial points (e.g., a set of trial points that is adjacent to the current best iterate on an underlying mesh). The objective function f(M,x) and constraint c(M,x) are evaluated at the trial points in set $P_k$.

At block 250, an update is performed. For instance, mesh size and barrier parameter are updated. The surrogate solution is mapped to its nearest mesh point. If the search step is unsuccessful, the poll step may reduce the mesh size. If the search step is successful, the mesh size may instead be increased.

Also at block 250, the set $V_k$ of all points evaluated thus far is updated by adding all trial points in $S_k$ and only evaluated trial points in set $P_k$. The surrogates are also updated based on the points in $V_{k+1}$.

At block 260, a termination criteria for the outer loop is tested. For instance, the method terminates when the mesh size is sufficiently small. If the termination criteria is not met, then the outer loop index is incremented (block 270), and control is returned to block 230, where another search step is performed.

If the termination criteria is satisfied, the search and poll method is finished. The output is a local numerical solution to the original, expensive optimization problem.

Thus disclosed is a search and poll method in which the fidelity level is an optimization variable used in the search. The requirement that the extra variable be equal to that of the highest fidelity simulation is formulated as a constraint, so that the fidelity level will be at the highest level at the solution, but can be relaxed during the optimization process to mitigate the computational burden.

A method herein is not limited to constrained optimization problems. Constraints are not required, but constrained optimization problems are generally harder to solve and, therefore, would benefit more significantly from a method herein.

Solving an optimization problem is not limited to minimizing the objective function and any constraints. For instance, the objective function (subject to any constraints) may be maximized by minimizing the negative of the objective function. Constraints are not limited to being less than or equal to zero.

Reference is now made to FIG. 3, which illustrates a computer system 310 for performing a search and poll method herein. The computer system 310 includes a processing unit 320 and computer-readable memory 330 encoded with data 340 that, when executed, causes the processing unit 320 to perform a search and poll method herein.

Consider the following example of designing structural components (e.g., ribs, spars, skin) of an aircraft wing. The objective function is typically weight of the wing. Design variables may include thicknesses, lengths, widths, and cross-sectional areas of individual structural components of the wing. It is desired to minimize the weight, subject to safety margin constraints on stress, displacement, buckling, etc. Constraints also include minimum thickness (lower bound) constraints on each component. The weight may be inexpensive to compute, since weight is the product of volume and density, the density of each material is known, and volume may be computed directly from the geometry of the structural components. However, the safety margin constraints require calling a structural analysis code, which is often computationally expensive to run.

The optimization method may start out with a guess—a preliminary design specifying the component sizes (i.e., the variables)—or with multiple guesses. The structural analysis code is then run to provide enough information (e.g., volumes, stresses, and displacements) to evaluate the objective and constraint functions.

The search and poll method is then used to provide a set of designs (reduced number of trial points). This provides new objective and constraint function values. The search and poll method is repeated until some termination condition is reached. The reduced number of trial points is then evaluated with the objective function and any constraints by running a high fidelity simulation.

Consider another example involving three-dimensional flow of air over an airfoil. A high fidelity simulation may be a Navier-Stokes solver with Reynolds-averaged turbulence. A mid-fidelity simulation may be an Euler or full potential solver. A low fidelity simulation may be a linearized potential flow. The objective function minimizes drag or maximize lift or lift-to-drag ratio. Constraints may include simple functions that prevent nonsensical geometries, such as a wing in a bowtie configuration.

An initial experimental design may produce the initial set $V_0$ of trial points, which may include points at all three fidelities (that is, a sample of evaluated points using all three simulations). An initial kriging model is constructed from this set $V_0$ of evaluated points.

The kriging model is optimized, perhaps by choosing multiple random starting points and running local optimizations from each starting point, thereby returning very promising new trial points because they are surrogate optimizers. These trial points are evaluated by the simulations in fidelity order, lowest to highest (i.e., linearized potential flow solver, then Euler, then Navier-Stokes), while at each step, removing those points performing poorly with respect to the objective function and constraints of the simulation at that level of fidelity. Each trial point that is evaluated by any simulation is added to the set $S_k$ of evaluated points and incorporated into the surrogates for the next iteration. If the search step fails to produce a non-dominated point with respect to the highest level of fidelity, the poll step is performed, whereby adjacent points are evaluated with the Navier-Stokes solver.

The invention claimed is:

1. A method for structural analysis, the method comprises:
   determining a preliminary design of a structure based on an objective function and constraint functions both having a plurality of discrete fidelity levels m=1, . . . , M, wherein the constraint functions correspond to one or more requirements of the structure;
   generating an initial set of trial points based on the objective function and the constraint functions;
   constructing and improving a plurality of surrogate functions of the objective function and of the constraint functions to identify a new set of trial points based on the initial set of trial points, wherein each surrogate function is a mixed variable surrogate function that corresponds to a discrete fidelity level of the plurality of discrete fidelity levels which is based on a dimensionality of the mixed variable surrogate function;
   identifying an adjacent set of trial points when the new set of trial points is empty, wherein the adjacent set of trial points is different from the initial set of trial points and the surrogate functions are updated based on a mapping to the adjacent set of trial points to identify the new set of trial points;
   running at least one lower fidelity simulation by evaluating lower fidelity surrogate functions in ascending order to reduce a number of trial points in the new set;
   evaluating the reduced number of trial points with the objective function and at least one of the constraint functions as a high fidelity simulation; and
   providing at least one structural design based on the evaluation of the reduced number of trial points;

wherein running the at least one lower fidelity simulation comprises looping through the plurality of discrete fidelity levels m=1 to M−1 in ascending order, where fidelity level M is a highest of the plurality of discrete fidelity levels, wherein for each iteration $S_k$ is the new set of trial points, the objective function and at least one of the constraint functions are evaluated at points $x \in S_k$ at fidelity level m and the surrogate functions are updated; the surrogate functions are evaluated at points $x \in S_k$ at fidelity level M; and the trial points from $S_k$ are removed for which the surrogate functions fail to return a value.

2. The method of claim 1, wherein at least two lower fidelity simulations are run.

3. The method of claim 1, wherein the constraint functions comprise nonlinear constraint functions; wherein the surrogate functions of the objective function and the nonlinear constraint functions are improved; and wherein the reduced number of trial points is evaluated with the objective function and the nonlinear constraint functions.

4. The method of claim 1, wherein determining the preliminary design of the structure comprises derivatives that are unavailable or unreliable, and the objective function and at least one of the constraint functions are non-smooth or discontinuous or fail when queried.

5. The method of claim 1, wherein kriging functions are used as the plurality of surrogate functions, each kriging function including a single regression function and at least one correlation matrix.

6. The method of claim 1, wherein each iteration comprises a search step to identify the new set of trial points and a poll step when the new set of trial points yields an empty set.

7. The method of claim 1, wherein the objective function and at least one of the constraint functions model three-dimensional flow of air over an airfoil.

8. The method of claim 1, wherein the initial set of trial points is generated based on a preliminary set of trial points constructed from a design of experiments and evaluated by the objective function and at least one of the constraint functions.

9. The method of claim 1, wherein each iteration comprises a search step to identify the new set of trial points and a poll step when the new set of trial points yields an empty set, and the lower fidelity surrogate functions are evaluated in ascending order such that the highest of the plurality of discrete fidelity levels is evaluated only once per search step.

10. The method of claim 1, wherein the at least one lower fidelity simulation comprises a simplified physics model of the high fidelity simulation.

11. A computer comprising a processor and memory encoded with data for causing the processor to perform a method for structural analysis, wherein the method comprises: determining a preliminary design of a structure based on an objective function and constraint functions both having a plurality of discrete fidelity levels m=1, . . . , M, wherein the constraint functions correspond to one or more requirements of the structure, generating an initial set of trial points based on the objective function and the constraint functions, constructing a plurality of surrogate functions based on the initial set of trial points, constructing and improving a plurality of surrogate functions of the objective function and of the constraint functions to identify a new set of trial points, wherein each surrogate function is a mixed variable surrogate function that corresponds to discrete fidelity level of the plurality of discrete fidelity levels which is based on a dimensionality of the mixed variable surrogate function, identifying an adjacent set of trial points when the new set of trial points is empty, wherein the adjacent set of trial points is different from the initial set of trial points and the surrogate functions are updated based on a mapping to the adjacent set of trial points to identify the new set of trial points, running at least one lower fidelity simulation by evaluating lower fidelity surrogate functions in ascending order to reduce a number of trial points in the new set; evaluating the reduced number of trial points with the objective function and at least one of the constraint functions as a high fidelity simulation; and providing at least one structural design based on the evaluation of the reduced number of trial points, wherein running the at least one lower fidelity simulation comprises looping through the plurality of discrete fidelity levels m=1 to M−1 in ascending order, where fidelity level M is a highest of the plurality of discrete fidelity levels, wherein for each iteration $S_k$ is the new set of trial points, the objective function and at least one of the constraint functions are evaluated at points $x \in S_k$ at fidelity level m and the surrogate functions are updated; the surrogate functions are evaluated at points $x \in S_k$ at fidelity level M; and the trial points from $S_k$ are removed for which the surrogate functions fail to return a value.

12. The computer of claim 11, wherein the constraint functions comprise nonlinear constraint functions.

13. The computer of claim 12, wherein the surrogate functions are mixed variable kriging functions.

14. The computer of claim 11, wherein at least two lower fidelity simulations are run per iteration.

15. The computer of claim 11, wherein each iteration comprises a search step to identify the new set of trial points and a poll step when the new set of trial points yields an empty set.

16. The computer of claim 11, wherein the at least one lower fidelity simulation comprises a simplified physics model of the high fidelity simulation.

17. An article comprising non-transitory computer-readable memory encoded with material that, when executed, causes a computer to perform a method for structural analysis, wherein the method comprises: determining a preliminary design of a structure based on an objective function and constraint functions both having a plurality of discrete fidelity levels m=1, . . . , M, wherein the constraint functions correspond to one or more requirements of the structure, generating an initial set of trial points based on the objective function and the constraint functions; constructing and improving a plurality of surrogate functions of the objective function and of the constraint function to identify a new set of trial points, wherein each surrogate function is a mixed variable surrogate function that corresponds to a discrete fidelity level of the plurality of discrete fidelity levels which is based on a dimensionality of the mixed variable surrogate function, running at least one lower fidelity simulation by evaluating lower fidelity surrogate functions in ascending order to reduce a number of trial points in the new set; evaluating the reduced number of trial points with the objective function and at least one of the constraint functions as a high fidelity simulation; and providing at least one structural design based on the evaluation of the reduced number of trial points, wherein running the at least one lower fidelity simulation comprises looping through the plurality of discrete fidelity levels m=1 to M−1 in ascending order, where fidelity level M is a highest of the plurality of discrete fidelity levels, wherein for each iteration $S_k$ is the new set of trial points, the objective function and at least one of the constraint functions are evaluated at points $x \in S_k$ at fidelity level m and the surrogate functions are updated; the surrogate functions are evaluated at points $x \in S_k$ at fidelity level M; and the trial points from $S_k$ are removed for which the surrogate functions fail to return a value.

18. The article of claim 17, wherein at least two lower fidelity simulations are run per iteration.

19. The article of claim 17, wherein the plurality of surrogate functions are mixed variable kriging functions, each kriging function comprising a single regression function and a single correlation matrix that take as inputs both a fidelity level and variables of the preliminary design of the structure.

20. The article of claim 17, wherein the at least one lower fidelity simulation comprises a simplified physics model of the high fidelity simulation.

\* \* \* \* \*